3,236,755
PREPARATION OF VANADIUM HEXACARBONYL
Robert P. M. Werner, Farmington, Mich., assignor to Ethyl Corporation, New York, N.Y., a corporation of Virginia
No Drawing. Original application Apr. 10, 1961, Ser. No. 101,652. Divided and this application May, 18, 1964, Ser. No. 374,224
3 Claims. (Cl. 204—86)

This is a division of application Serial No. 101,652, filed April 10, 1961.

This invention relates to processes for forming vanadium hexacarbonyl. More specifically, the invention relates to processes for forming vanadium hexacarbonyl by treatment of an alkali or alkaline earth metal-etherate salt containing the hexacarbonyl vanadate anion.

An object of this invention is to provide novel processes for preparing vanadium hexacarbonyl. A further object is to provide processes for preparing vanadium hexacarbonyl which utilize as the starting material an alkali or alkaline earth metal-etherate salt containing the hexacarbonyl vanadate anion. Additional objects will become apparent from the following discussion and claims.

The objects of my invention are accomplished by providing several processes for converting an alkali or alkaline earth metal-etherate salt containing the hexacarbonyl vanadate anion to vanadium hexacarbonyl. The alkali metals are lithium, sodium, potassium, rubidium, and cesium. Appropriate alkaline earth metals are calcium, strontium, barium, and magnesium. Other appropriate metals are aluminum and zinc. The first and preferred process for accomplishing this end involves treating an alkali or alkaline earth metal-ether-hexacarbonyl vanadate salt with a strong non-oxidizing acid. A large excess of acid, generally from about 10 to about 100 times the stoichiometric amount, is employed in this reaction. The reaction is carried out under normal temperature conditions which are generally in the order of room temperature or about 25° C. In order to avoid decomposition of the vanadium hexacarbonyl product, the reaction is preferably carried out under an inert atmosphere such as nitrogen, argon, krypton and the like, at about atmospheric pressure or under vacuum. In order to assure an even reaction rate the reaction mixture is preferably agitated.

The vanadium hexacarbonyl product can be readily separated from the reaction mixture by conventional means since the product is hydrophobic and floats on the surface of the reaction mixture. One simple means of separation is to filter off the vanadium hexacarbonyl from the reaction mixture.

In a preferred version of my above described process, a strong non-oxidizing acid is employed as the acid reactant, which acid is relatively non-volatile and has a vapor pressure in the order of not more than one-tenth that of vanadium hexacarbonyl. When utilizing the non-volatile acid as the reactant, the ether present in the vanadium-containing salt is a relatively non-volatile one having a vapor pressure which is much less than that of vanadium hexacarbonyl. This assures that during the separation step, the vanadium hexacarbonyl product will not be contaminated by the ether which was present in the alkali or alkaline earth metal-ether-hexacarbonyl vanadate starting material. Preferred hexacarbonyl vanadate-containing salts which I employ in my process have the formula:

$$[Na(Et.)_2]^+[V(CO)_6]^-$$

in which Et. is a tridentate non-cyclic ether. These compounds have high stability and also the tridentate ether, Et. is relatively non-volatile (having a vapor pressure of not more than one-tenth that of vanadium hexacarbonyl). Typical tridentate non-cyclic ethers which fulfill the requirements of Et. are diethyleneglycol dimethylether, diethyleneglycol dibutylether, dipropyleneglycol dimethylether, dipropyleneglycol dibutylether, diethyleneglycol methylethylether, and the like. A preferred tridentate ether is diethyleneglycol dimethylether.

In the preferred form of my process in which the acid is a non-volatile one, as described above, and the ether present in the hexacarbonyl vanadate-containing salt is non-volatile, I can separate the vanadium hexacarbonyl product very readily from the system by heating under reduced pressure. Since both the acid reactant and the ether which is liberated during the reaction are relatively non-volatile, they are not vaporized during this heating step. Thus, the vanadium hexacarbonyl product is sublimed off in a highly pure state, uncontaminated by either ether or acid.

A preferred non-volatile acid which I employ in my process is phosphoric acid. This acid is strong, non-oxidizing, and extremely non-volatile. Its use in my process makes possible the obtaining of very high yields of vanadium hexacarbonyl by simply subliming the vanadium hexacarbonyl from the reaction mass at normal temperatures under reduced pressures.

To further illustrate my process, there are presented the following examples in which all parts and percentages are by weight unless otherwise indicated.

*Example I*

A mixture comprising 3.325 grams of sodium bis(diethylene-glycol dimethylether) hexacarbonyl vanadate in 25 ml. of paraffin oil was degassed in vacuum and 9 ml. of 85 percent phosphoric acid were added. The flask in which the reactants were contained was attached to a vacuum pump which was connected in series with a dry ice trap. During the course of the reaction, vapors were continuously pulled from the reaction mixture and passed through the cold trap. After gas evolution ceased, the blue solid formed in the reaction mixture was removed and purified by flash sublimation through a calcium chloride-containing tube into a Dry-Ice cooled trap. After several resublimations under full pump vacuum, there was obtained the analytical sample. The freshly sublimed vanadium hexacarbonyl is volatile and is soluble in hydrocarbons and ether. Its structure was confirmed by means of its analysis and the infra-red spectrum of the compound.

*Example II*

To a reaction vessel which was connected with a vacuum source in series with a cold trap was added 7.8 grams of sodium bis(diethyleneglycol dimethylether) hexacarbonyl vanadate. After evacuating the vessel to a pressure of 0.1 mm. of mercury, 40 ml. of 100 percent phosphoric acid was added. Very little gas evolution occurred and hydrophobic, dark vanadium hexacarbonyl formed on the top of the liquid surface. The vanadium hexacarbonyl was sublimed from the reaction vessel through a calcium chloride-containing tube into a cold trap (through straight tubing free from constrictions) by heating the reaction vessel at a temperature of 50 to 55° C. under the partial vacuum in the system. After less than two hours of heating, the vanadium hexacarbonyl product had condensed quantitively in the Dry Ice trap forming large crystals and leaving a colorless and vanadium-free phosphoric acid behind in the reaction vessel. The yield of product was 3.3 grams of crystalline vanadium carbonyl which corresponds to a yield of 98 percent of the theoretical.

Example III

An aqueous solution containing 0.10 mole of a sodium-dimethoxyethane-hexacarbonyl vanadate salt is placed in a reaction vessel under a nitrogen atmosphere. There are then added 3 moles of hydrochloric acid in aqueous solution over a 10-minute period with stirring of the reaction mixture and external cooling of the reaction vessel. The reaction mixture is then filtered to remove the hydrophobic vanadium hexacarbonyl product. The product is washed with water and sublimed over calcium chloride to give a good yield of vanadium hexacarbonyl.

A further method which is part of my invention involves the oxidation of an alkali or alkaline earth metal-ether-hexacarbonyl vanadate salt to form vanadium hexacarbonyl. In performing this method, the salt, which is preferably a sodium bis(tridentate noncyclic ether) hexacarbonyl vanadate as described previously, is treated with a mild oxidizing agent such as a salt containing the ferric ion, a salt containing the mercuric ion, or a salt containing the stannic ion. Examples of such salts are ferric chloride, stannic chloride and mercuric acetate.

The oxidation reaction is preferably carried out in an aqueous medium having a supernatant layer of hydrocarbon covering the surface of the aqueous solution. As the hydrophobic vanadium hexacarbonyl product is formed during the reaction, it is dissolved in the supernatant layer of the hydrocarbon solvent which can be readily separated from the aqueous reaction mixture. After separation of the supernatant hydrocarbon layer containing the vanadium hexacarbonyl product, the vanadium hexacarbonyl can be readily separated therefrom by conventional means such as crystallization, distillation, sublimation, and chromatography.

The above process can be carried out under normal conditions of temperature and pressure such as, for example, room temperature and one atmosphere of pressure. During the reaction, the mixture is preferably agitated since this aids in promoting a uniform reaction rate. The process is preferably conducted under a blanketing atmosphere of an inert gas such as nitrogen, argon, krypton, and the like.

To further illustrate the scope of my oxidation process, there are presented the following examples in which all parts and percentages are by weight unless otherwise indicated.

Example IV

A mixture comprising 0.01 mole of tropenium bromide in water is added to 0.01 mole of sodium bis(diethyleneglycol dimethylether) hexacarbonyl vanadate in water. Reaction system contains a supernatant layer of n-heptane which covers the aqueous system. Immediately after the addition of the tropenium bromide to the sodium bis(diethyleneglycol dimethylether) hexacarbonyl vanadate, a reaction occurred and there is formed a bluish precipitate of vanadium hexacarbonyl. In addition, gas is evolved. The bluish solid dissolved in the supernatant layer of n-heptane giving a yellow color. The vanadium hexacarbonyl is isolated by first stripping off the solvent followed by sublimation of vanadium hexacarbonyl from the residue which also contains 1-cycloheptatrienyl cycloheptatriene.

Example V

A clear yellow solution, obtained by mixing an aqueous solution of two grams of sodium bis(diethyleneglycol dimethylether) hexacarbonyl vanadate with an aqueous solution containing 7.8 grams of ammonium chloride followed by filtration, was treated with 2.5 grams of mercuric chloride dissolved in water. There was produced an orange-pink, non-crystalline precipitate, the mercuric salt of hexacarbonyl vanadate, which was filtered under nitrogen, washed with water and dried in vacuum. During the drying operation, it was observed that bluish material was collecting in the cold trap which was connected in series with the vessel containing the material being dried. This material was analyzed and found to be vanadium hexacarbonyl.

Similar results to those set forth in Examples VI and VII are obtained when I employ other oxidizing agents such as ferric chloride, stannic chloride and the like. Thus, vanadium hexacarbonyl is obtained from oxidation of a potassium-dimethoxyethane-hexacarbonyl vanadate salt with either ferric chloride or stannic chloride.

A further aspect of my invention involves the use of still another method in forming vanadium hexacarbonyl from an alkali or alkaline earth metal-ether salt containing the hexacarbonyl vanadate anion. This process involves the electrolysis of a solution containing the salt. During the course of the electrolysis, the salt is oxidized and there is formed at the anode the compound vanadium hexacarbonyl.

To illustrate further this form of my process, there is presented the following example in which all parts and percentages are by weight unless otherwise indicated.

Example VI

An aqueous solution of about one gram of sodium bis(diethyleneglycol dimethylether) hexacarbonyl vanadate in water was placed in a Slomin electronanalyzer having platinum electrodes. Three volts potential was impresed across the electrodes by means of a voltage source. After application of the voltage between the electrodes, gas was evolved and vanadium hexacarbonyl having a bluish color was formed at the anode.

Similarly, I can form vanadium hexacarbonyl by the electrolytic oxidation of other alkali or alkaline earth metal-ether-hexacarbonyl vanadate salts in the manner of Example VIII. Thus, electrolysis of sodium bis(dipropyleneglycol dimethylether) hexacarbonyl vanadate or the potassium - dimethoxyethane - hexacarbonyl vanadate salt yields vanadium hexacarbonyl.

Vanadium hexacarbonyl formed as above by electrolysis, can be readily separated from the reaction system by having a supernatant layer of a hydrocarbon solvent covering the surface of the aqueous reaction system. The vanadium hexacarbonyl being hydrophobic, collects in this layer. It is thereby readily separated from the mixture.

The product vanadium hexacarbonyl formed by the various methods of my invention has a variety of utilities. One utility is the use of vanadium hexacarbonyl in forming a metal-containing coating. In so doing, the object to be plated is placed in a closed container containing vanadium hexacarbonyl and heated to a temperature in the vicinity of 400° C. This causes decomposition of the vanadium hexacarbonyl and deposition of a vanadium-containing coating on the heated object. The coating operation is preferably carried out in the presence of an inert gas or the like to prevent oxidation of the substrate material or the vanadium hexacarbonyl.

A further utility for vanadium hexacarbonyl is in forming other organometallic compounds containing vanadium. Thus, vanadium hexacarbonyl can be reacted with cycloheptatriene or substituted cycloheptatrienes to form a tropenium vanadium tricarbonyl compound. To illustrate this, there is presented the following example in which all parts and percentages are by weight unless otherwise indicated.

Example VII

A mixture comprising 8.5 grams of vanadium hexacarbonyl, 18.4 grams of cycloheptatriene and 300 ml. of n-hexane was stirred and heated at reflux (63 to 68° C.) for one hour under nitrogen. During this time, a large quantity of gas was evolved which comprised largely carbon monoxide. The reaction mixture was then filtered while warm, using filter aid, under nitrogen to give a green solution and a fine brownish precipitate which was washed several times with n-hexane. The volume of the green solution, including the washings, was reduced in volume to about 25–30 ml. and on cooling in a Dry Ice acetone bath, there were obtained shiny, brown-black crystals. After two recrystallizations of the black material from n-hexane, there was obtained 1.9 grams of the crystalline material. The moderately stable compound melted at 134–137° C., could be sublimed at 40–80° C. under vacuum and was found to be diamagnetic. On analysis there was found: C, 53.0; H, 3.44; V, 22.5. Calculated for $C_{10}H_7VO_3$: C, 53.12; H, 3.12; V, 22.54 percent. The molecular weight as determined by the Signer method was found to be 220. That calculated for $C_{10}H_7VO_3$, tropenium vanadium tricarbonyl, was 226.11. On the basis of the above analytical data and also nuclear magnetic resonance data, the compound was unequivocally established as tropenium vanadium tricarbonyl.

In another experiment, vanadium hexacarbonyl in petroleum ether was reacted with nitric oxide while cooling the reaction mixture with Dry Ice. As a result there was formed a nitrosyl vanadium carbonyl compound, which in solution showed splitting of the original CO stretching band of vanadium hexacarbonyl at 1,975 reciprocal centimeters into two sharp peaks at 1,965 and 1,985 reciprocal centimeters. In addition, two strong absorptions at 1,656 and 1,689 reciprocal centimeters showed the presence of nitric oxide in the compound which was formed.

Vanadium hexacarbonyl can also readily be reacted with phosphines, arsines, or stibines to form a bis(phosphine, arsine, or stibine) vanadium tetracarbonyl compound. To illustrate this, there are presented the following examples in which all parts and percentages are by weight unless otherwise indicated.

*Example VIII*

A mixture comprising 3 grams of vanadium hexacarbonyl, 11 grams of triphenylphosphine and 40 ml. of n-hexane was stirred at room temperature for five hours, during which time 840 ml. of gas was given off. Stirring was continued overnight and only a small additional amount (30 ml.) of gas was evolved. The yellow-orange precipitate, which had formed during the reaction, was filtered, washed with n-hexane and dried in vacuum. The yield of crude product was 11.1 grams.

Since the product was unstable in most solvents, it was recrystallized by dissolving small quantities of it in dichloromethane and quickly filtering the solution into a container submerged in a Dry Ice-acetone bath and then adding cold methanol. The total yield of product obtained in this manner was 5.9 grams. It melted at 142° C. with decomposition, was air sensitive, and was paramagnetic. The compound was insoluble in n-hexane, petroleum ether, water, methanol, and ethanol and slightly soluble in ether. It dissolved in benzene and diethyleneglycol dimethylether without any immediate apparent decomposition. In dichloromethane, tetrahydrofuran, acetone and chloroform, it dissolved with slow decomposition giving a dark precipitate. In carbon tetrachloride, it decomposed instantaneously. The compound was analyzed and identified as bis(triphenylphosphine) vanadium tetracarbonyl.

*Example IX*

A mixture comprising one gram of vanadium hexacarbonyl, 4.8 grams of triphenylstibine, and 25 ml. of n-hexane was stirred at room temperature for 3 hours during which time 350 ml. of gas was collected from the reaction. After continued stirring overnight, a fine greenish-yellow precipitate had formed. The reaction mixture was then filtered under nitrogen to remove the precipitate and the precipitate was washed with n-hexane and dried in vacuum. The crude product was dissolved in ice-cold dichloromethane and filtered under nitrogen (using filter aid) directly into stirred, cold methanol which was cooled with Dry Ice. The greenish-yellow precipitate which was produced was quickly filtered while cold, under nitrogen, washed with cold methanol and dried in vacuum. The product was pyrophoric and showed a strong band at 5.39 microns with shoulders at 5.2 and 5.55 microns. The compound was found to be bis(triphenylstibine) vanadium tetracarbonyl by means of elemental analysis.

Using a similar procedure to that employed in Examples VIII and XI, bis(triphenylarsine) vanadium tetracarbonyl was formed.

The bis(triphenylstibine), bis(triphenylarsine) or bis(triphenylphosphine) vanadium tetracarbonyl compounds, formed as in the preceding examples, can be further reacted to yield still different organometallic compounds. As an example, these compounds can be reacted with nitric oxide to yield triphenylphosphine, triphenylarsine, or triphenylstibine-nitric oxide vanadium tetracarbonyl. To illustrate, there is presented the following example in which all parts and percentages are by weight unless otherwise indicated.

*Example X*

About one gram of crude bis(triphenylphosphine) vanadium tetracarbonyl was mixed with filter aid and washed thoroughly with methanol and petroleum ether to remove any free triphenylphosphine. After suspending the washed solids in about 100 ml. of petroleum ether, nitric oxide from a cylinder was bubbled through the suspension from a fritted plate in the bottom of the reaction flask. After about one minute, the originally colorless supernatant liquid had assumed an orange-yellow color. The nitric oxide feed was then discontinued and the solution was filtered through the fritted plate. On standing for one hour, large crystals separated from the clear orange-yellow solution. The crystals were filtered, dried, and analyzed.

The crystalline solid was stable in air for several hours before it darkened and decomposed. It was also slightly sensitive to light when stored under nitrogen as evidenced from a superficial change of color. The compound was soluble in most organic solvents without decomposition as long as it was kept under a nitrogen blanket. An extensive study of the infrared spectrum of the compound plus an elemental analysis showed the compound to be triphenylphosphine nitric oxide vanadium tetracarbonyl.

Compounds of the type bis(triphenylphosphine)vanadium tetracarbonyl, bis(triphenylarsine)vanadium tetracarbonyl and bis(triphenylstibine)vanadium tetracarbonyl can be reduced by treating them with a reductant in the presence of a neutral solvent. There is formed from this reaction a triphenylphosphine-pentacarbonyl-vanadium(−1)anion, a triphenylarsine-pentacarbonyl-vanadium(−1)anion, or a triphenylstibine-pentacarbonyl-vanadium(−1)anion. To illustrate this reaction, there is presented the following example in which all parts and percentages are by weight unless otherwise indicated.

*Example XI*

A suspension of 3 grams of bis(triphenylphosphine)vanadium tetracarbonyl in 80 ml. of ethanol was shaken for 15 to 30 minutes with an excess of freshly prepared liquid sodium amalgam having a sodium content of about one percent by weight. Shaking was continued until the originally colorless solvent had taken on a red-brown color. Addition of excess aqueous tetraethylammonium iodide solution to the clear filtered orange solution gave a voluminous yellow precipitate which was washed exhaustively with water, ethanol, and ether and then dried. Recrystallization of the solid product from acetone/ether gave 1.25 grams of a crystalline yellow solid which was stable in air and had a melting point of 180–182° C. This compound was found to be tetraethyl ammonium-[triphenylphosphine-pentacarbonyl-vanadium(−1)]. The portion of the molecule within the brackets is an anion having a charge of minus one. On analysis there was found: C, 63.8; H, 6.19; N, 2.41; P, 5.4; V, 8.7; CO, 23.6.

Calculated for $C_{31}H_{35}NPO_5V$: C, 63.8; H, 6.04; N, 2.4; P, 5.31; V, 8.73; CO, 24.0 percent. The compound was found to be diamagnetic and its structure was compatible with its infrared spectrum which showed absorptions in the metal carbonyl region at 1767, 1805, 1842, and 1953 reciprocal centimeters.

Using the procedure of Example XI, there was prepared the similar compound tetramethyl ammonium-[triphenylphosphine - pentacarbonyl-vanadium(—1)] which showed on analysis: C, 61.9; H, 5.4; P, 5.8. Calculated for $[(CH_3)_4N][(C_6H_5)_3PV(CO)_5]$: C, 61.48; H, 5.16; P, 5.87 percent. The compound was a yellow crystalline solid which was stable in air for several hours. The tri(o-phenanthroline)nickel(II) salt of this compound was formed and was a purple-brown solid having a melting point of 134–136° C. with decomposition.

As shown by the foregoing specification, my novel processes provide improved means for the preparation of vanadium hexacarbonyl, which is a useful compound having many utilities such as in metal plating and as a chemical intermediate. My desire, therefore, is to be limited only within the lawful scope of the appended claims.

I claim:

1. A process comprising subjecting a salt solution containing the hexacarbonyl vanadate anion to electrolysis between a cathode and an inert anode whereby vanadium hexacarbonyl is formed at the anode.

2. A process for the preparation of vanadium hexacarbonyl, said process comprising subjecting a salt solution containing the hexacarbonyl vanadate anion to electrolysis using platinum electrodes whereby vanadium hexacarbonyl is formed at the anode.

3. A process for the preparation of vanadium hexacarbonyl, said process comprising subjecting a salt solution containing the hexacarbonyl vanadate anion to electrolysis using platinum electrodes and a three-volt direct current potential whereby vanadium hexacarbonyl is formed at the anode.

References Cited by the Examiner

UNITED STATES PATENTS 3,053,629   9/1962   Pruett et al. _____ 23—203

FOREIGN PATENTS 609,886   10/1960   Italy.

JOHN H. MACK, *Primary Examiner.*

WINSTON A. DOUGLAS, *Examiner.*